United States Patent Office 3,347,932
Patented Oct. 17, 1967

3,347,932
SYNTHESIS OF QUATERNARY
PHOSPHONIUM SALTS
Albert J. Chechak, Rochester, N.Y., assignor to Eastman Kodak Company, Rochester, N.Y., a corporation of New Jersey
No Drawing. Filed Feb. 11, 1964, Ser. No. 343,965
14 Claims. (Cl. 260—606.5)

ABSTRACT OF THE DISCLOSURE

A process for synthesizing a quaternary phosphonium salt such as a retinyl triphenylphosphonium salt by reacting an ether such as a retinyl ether with a tertiary phosphine salt such as triphenyl phosphonium hydrochloride. The triphenyl phosphonium hydrochloride can be used as a starting material, or its formation in situ may be accomplished by starting with triphenyl phosphine and a strong acid such as HCl as reactants.

---

This invention pertains to organic chemistry. More particularly, it relates to the synthesis of certain quaternary phosphonium salts.

The quaternary phosphonium salts involved in this invention are compounds represented by the Formula I:

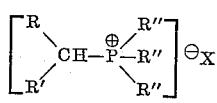

wherein R is selected from the group consisting of hydrogen and methyl radicals, R′ is selected from the group consisting of (1) aliphatic, carbocyclic and carbocyclic-aliphatic radicals, each of which has olefinic unsaturation at least at the α carbon atom and (2) carbalkoxy radicals wherein the alkoxy moieties have 1–8 carbon atoms, each R″ is independently selected from the group consisting of substituted and unsubstituted, saturated and unsaturated, aliphatic, carbocyclic and carbocyclic-aliphatic radicals, and X is an anion of a strong acid. These compounds are useful as intermediates in the synthesis of other compounds. For example, one of the quaternary phosphonium salts involved in this invention is retinyl triphenylphosphonium salt. This is a compound represented by the Formula II:

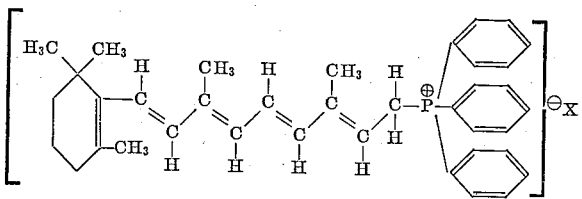

wherein X is an anion of a strong acid. This compound has utility as an intermediate in the synthesis of β-carotene by a known process. In this process, the retinyl triphenylphosphonium salt is reacted with (1) a base such as potassium hydroxide and (2) retinal in a suitable liquid reaction medium, whereby β-carotene is formed. Heretofore, retinyl triphenylphosphonium salt has been made by reacting retinol with a triphenylphosphine salt in methanol. This invention in its more specific aspects provides another process for making it.

This invention is based upon the discovery that quaternary phosphonium salts represented by the Formula I can be made directly from ethers of the following Formula III.

In summary, this invention comprises a process for making a quaternary phosphonium salt represented by Formula I, which process comprises: admixing (A) an ether represented by the Formula III:

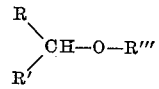

wherein R and R′ have the same significance as in Formula I and R‴ is selected from the group consisting of aliphatic hydrocarbon radicals and the tetrahydropyranyl radical, and (B) a tertiary phosphine salt represented by the Formula IV:

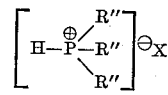

wherein R″ and X have the same significance as in Formula I, whereby a reaction product consisting essentially of a quaternary phosphonium salt represented by Formula I is formed. The chemical reaction that is involved is represented by the following equation:

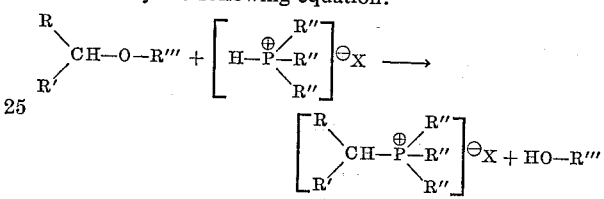

Ethers represented by Formula III constitute a class of compounds too numerous to list here. In general, they can be regarded as compounds wherein the moiety

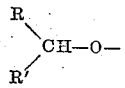

is derived from primary and secondary alcohols, and the radical R‴ is derived from halides (the reaction being carried out in the presence of a base) and acrylates (the reaction being carried out in the presence of an alkali catalyst) of aliphatic hydrocarbons and of tetrahydropyran. In this connection, under the concepts of this invention, there do not appear to be any limitations on the aliphatic hydrocarbon radical R‴ and thus on compounds from which this portion of the ether moiety is derived. Examples of ethers of Formula III include the retinyl ethers such as retinyl methyl ether, methyl β-retinyloxy propionate and the like. Retinyl ethers of aliphatic alcohols as a class have far greater chemical stability than retinol. Hence, the process of this invention in connection with the synthesis of retinyl triphenylphosphonium salt has a feature of advantage in that the reaction product obtained thereby is relatively free of side products such as dehydroretinyl triphenylphosphonium salt, which often accompany retinyl triphenylphosphonium salt when it is made from retinol.

A tertiary phosphine salt of the Formula IV is a compound that is formed when a tertiary phosphine represented by Formula V:

wherein each R″ has the same significance as in Formula I, and a strong acid are mixed together under the conditions of this invention. Indeed, in preferred embodiments of this invention the tertiary phosphine salt is formed in situ in the reaction mixture. In these embodiments a strong acid is added to the mixture of an ether represented by Formula III and a tertiary phosphine of Formula V, whereupon a tertiary phosphine salt is formed, which in turn reacts with the ether to form the desired quaternary phosphonium salt. Examples of a strong acid are hydrochloric acid, sulfuric acid, phosphoric acid, hydrobromic acid, p-toluenesulfonic acid and the like. In this connection, a strong acid is an acid having at 18–25° C. a dissociation constant (the first dissociation constant when more than one is involved) of at least $1 \times 10^{-2}$. Examples of tertiary phosphines include:

Triphenylphosphine
Tri-p-tolylphosphine
Tri-o-tolylphosphine
Tri-m-tolylphosphine
Tri-p-methoxyphenylphosphine
Tri-o-methoxyphenylphosphine
Tri-m-methoxyphenylphosphine
Tri-p-nitrophenylphosphine
Tri-o-nitrophenylphosphine
Tri-m-nitrophenylphosphine
Tri-p-chlorophenylphosphine
Tri-o-chlorophenylphosphine
Tri-m-chlorophenylphosphine
Tri-p-bromophenylphosphine
Tri-o-bromophenylphosphine
Tri-m-bromophenylphosphine
Tri-p-ethoxyphenylphosphine
Tribenzylphosphine
p-Dimethylaminophenyl diphenylphosphine
p-Dimethylaminophenyl dimethylphosphine
Diallylphenylphosphine
Tris-(2-cyanoethyl)phosphine
Dicyanoethyl phenylphosphine
Tricyclohexylphosphine
Cyclohexyldimethylphosphine
Triamylphosphine
Dicyclohexylmethylphosphine
Dicyclohexylphenylphosphine
Dimethylphenylphosphine
Dimethyl p-nitrophenylphosphine
Dimethyl p-methoxyphenylphosphine
Dimethyl p-chlorophenylphosphine
Dimethyl p-bromophenylphosphine
Diallymethylphosphine
Methyl diphenylphosphine
Ethyl diphenylphosphine.

In carrying out the process of this invention the quantities of ether and tertiary phosphine salt, or of ether, tertiary phosphine and the strong acid admixed together are preferably at least chemically equivalent. In other words, for a given quantity of ether there is admixed therewith preferably at least one chemically equivalent quantity of tertiary phosphine salt and preferably a small excess. For in situ formation of the tertiary phosphine salt the quantities of tertiary phosphine and strong acids employed are preferably at least chemically equivalent.

Preferably, admixing of the reactants is carried out in a liquid reaction medium consisting essentially of an inert, $C_1$–$C_8$ alkyl, monohydric alcohol. Examples of such an alcohol are methanol, ethanol, propanol, isopropanol, butanol and the like.

The temperature at which admixing of the reactants is carried out is generally in a range from about 20 to about 150° C., although higher and lower temperatures can be employed. Temperatures above about 30° C. are not recommended in some embodiments, however, because the ethers in these embodiments have enough instability at such temperatures as to give rise to unwanted byproducts. Temperatures lower than about 20° C. are not recommended in all embodiments, however, because in some embodiments the reaction at such temperatures goes too slowly to be practical. In the case of retinyl ethers and the quaternary phosphonium salts made therefrom according to this invention, the preferred reaction temperature is about 25–30° C.

The reaction time is generally in a range from about one-half hour to about four hours. Longer and shorter reaction times can be employed, however, depending on such factors as the quantity of reaction mixture and reaction temperature. In general, the smaller the quantity of reaction mixture, the shorter the reaction time while the greater the quantity of reaction mixture the longer the reaction time. The higher the reaction temperature the shorter the reaction time while the lower the reaction temperature the longer the reaction time.

The order of addition of the reactants does not appear to be critical. However, in preferred embodiments of this invention, which are based on formation in situ of the tertiary phosphine salt, the ether and the tertiary phosphine are dissolved in a monohydric, lower alkyl alcohol to form a first reaction mixture portion while the strong acid is dissolved in a monohydric, lower alkyl alcohol to form a second reaction mixture portion. The two reaction mixture portions are then admixed, preferably by adding the second reaction mixture portion to the first reaction mixture portion with stirring, and the resulting reaction mixture is stirred for the desired reaction time at the desired reaction temperature. In these preferred embodiments and other embodiments of this invention which involve an air oxidation susceptible ether, for example, retinyl ether, it is recommended that the part of the mixing procedure involving the ether and then the desired quaternary phosphonium salt be performed under an inert gas such as, for example, nitrogen, so as to minimize oxidative attack of the ether and the resulting quaternary phosphonium salt.

At the conclusion of the reaction time, the resulting reaction mixture can be treated by distillation and washing procedures to isolate the desired quaternary phosphonium salt. However, in the syntheses of various end products such as, for example β-carotene and the like, the quaternary phosphonium salt need not be isolated from the reaction mixture. In other words, the reaction mixture can be used directly in these syntheses.

This invention is further illustrated by the following examples of various aspects thereof, including specific embodiments. This invention is not limited to these specific embodiments unless otherwise indicated.

*Example 1*

This example illustrates the preparation according to one embodiment of this invention of a product consisting essentially of a retinyl triphenylphosphonium salt.

1.00 gram (0.0033 mole) of retinyl methyl ether is dissolved at 25–30° C. in 5 milliliters of methanol. To the solution thus formed there is added at 25–30° C. under nitrogen 0.875 gram (0.0033 mole) of triphenylphosphine and 1.25 milliliters (0.0033 mole) of 2.72 N methanolic hydrochloric acid. The reaction mixture thus formed is then stirred at 25–30° C. for about two and one-half hours. The reaction mixture thus formed consists essentially of retinyl triphenylphosphine chloride. This can be verified by taking an aliquot sample of the reaction mixture and running an ultraviolet absorption measurement on the material remaining in the sample after it has been freed from the solvent.

*Example 2*

This example illustrates the synthesis of β-carotene from the retinyl triphenylphosphonium chloride product of Example 1.

The retinyl triphenylphosphonium chloride product of Example 1 is cooled to 5° C. and under nitrogen a solution of 0.99 gram (0.0035 mole) of retinal and 3 milliliters of ethanol, in a solution of 0.187 gram (0.0033 mole) of potassium hydroxide and 2 milliliters of ethanol are simultaneously added with stirring to the retinyl triphenylphosphonium chloride product. Within a few minutes red solids appear. However, stirring of the reaction mixture is continued for 18 hours at 5° C. under nitrogen. Thereafter, the reaction mixture is filtered, the filter cake washed successively with methanol, and water and methanol, and then dried over calcium chloride under vacuum for 20 hours. The resulting product consists essentially of β-carotene. A typical quantity of the product thus obtained under these conditions is 1.57 grams, representing a 75% yield. A typical ultraviolet absorption value of the product is E(1%, 1 cm.) (454 mu, cyclohexane) =2105.

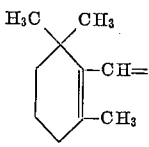 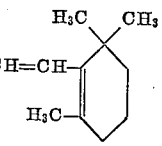

Example 3

This example illustrates the preparation of a retinyl triphenylphosphonium salt according to another specific embodiment of the process of this invention.

A solution is prepared from 3.03 grams (0.0081 mole) of methyl β-retinyloxy propionate and 18 milliliters of methanol. To this solution there are added at 25–30° C. under nitrogen and with stirring 2.14 grams (0.0081 mole) of triphenylphosphine and 3 milliliters (0.0081 mole) of 2.72 N methanolic hydrochloric acid. The mixture thus formed is stirred under nitrogen for one and three-quarter hours. The reaction product thus obtained consists essentially of retinyl triphenylphosphonium chloride. This can be verified by an ultraviolet absorption measurement of an aliquot specimen of the reaction product freed of solvent. An absorption at 340 mu is typical of this salt.

This retinyl triphenylphosphonium chloride product also can be used as such in the synthesis of β-carotene. Thus, after cooling the reaction product to 5° C., a solution of 2.40 grams (0.0084 mole) of retinal in 7.5 milliliters of ethanol and a solution of 0.46 gram (0.082 mole) of potassium hydroxide and 5 milliliters of ethanol are added simultaneously to it under nitrogen while stirring. After this reaction mixture has stood at 5° C. for 20 hours, the red solids which have formed therein are collected, washed successively with methanol, and water and methanol, and then dried over calcium chloride under vacuum for 24 hours. The product thus obtained consists essentially of β-carotene. A typical quantity of such a product is 3.55 grams (0.0051 mole), representing a 63% yield of β-carotene. A typical ultraviolet absorption value of the product is E(1%, 1 cm) (454 mu, cyclohexane)=1890.

Example 4

This example illustrates the preparation according to one embodiment of this invention of a β-ionylideneethyl triphenylphosphonium salt.

A solution consisting essentially of 0.183 gram (0.005 mole) of hydrogen chloride and 1.85 milliliters of methanol is added over a period of 20 minutes to a stirred mixture at 25–30° C. of 1.17 grams (0.005 mole) of the methyl ether of β-ionylidene ethanol, 1.43 grams (0.0055 mole) of triphenylphosphine and 2 milliliters of methanol. Stirring of the resulting reaction mixture is continued for 2 hours at 25–30° C. The reaction product thus obtained consists essentially of β-ionylideneethyl triphenylphosphonium chloride as represented by the formula:

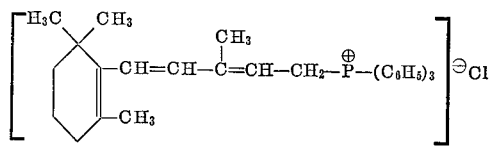

This can be verified by removing a 2 milliliter aliquot sample of the reaction product, freeing it of solvent, and then running an ultraviolet absorption measurement and an infrared absorption measurement on it. Typically, a 2 milliliter aliquot portion of the reaction product contains about 0.77 gram of the salt and the remainder of the reaction product contains about 0.0035 mole of the salt.

β-Ionylideneethyl triphenylphosphonium salt is useful as an intermediate in the synthesis of the carotenoid 1,14-bis(2,6,6 - trimethylcyclohex - 1 - enyl) - 3,7,12 - trimethyltetradec - 1,3,5,7,9,11,13 - heptaene which has the formula:

and which is useful in poultry feed for pigmenting poultry skin and egg yolks. This $C_{35}$ hydrocarbon can be synthesized from the salt in the following manner.

Without removing the salt from the remainder of the reaction product, the salt is coupled to 1.0 gram (0.0035 mole) of retinal according to the procedure set forth in Example 2. A typical quantity of the product so obtained is 1.1 grams, representing a yield of about 66%. Such a product has about 91% purity and at such purity gives an ultraviolet absorption measurement of E(1%, 1 cm) (416 mu, cyclohexane)=1850. The melting point of the product is 139° C.

Example 5

This example illustrates the preparation according to a specific embodiment of this invention of a β-ionyl triphenylphosphine salt.

A solution of 0.365 gram (0.01 mole) of hydrogen chloride and 2.7 milliliters of methanol is added over a period of 20 minutes to a stirred mixture at 25–30° C. of 2.94 grams (0.01 mole) of β-ionyl tetrahydropyranyl ether, 2.86 grams (0.011 mole) of triphenylphosphine and 4 milliliters of methanol. The reaction mixture thus formed is stirred at 25–30° C. for two hours. There is thus formed a reaction product consisting essentially of β-ionyl triphenylphosphine chloride. This can be confirmed by removing a 2 milliliter aliquot portion of the reaction product, freeing the same of solvent and then ascertaining the ultraviolet absorption and infrared absorption spectra of it. The material remaining after the removal of solvent is a colorless glass and typically has an ultraviolet absorption maximum at 286 mu. The formula of the salt is:

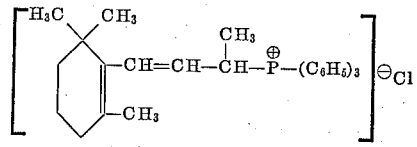

This salt is useful as an intermediate in the preparation of, for example, a carotenoid having pigmenting activity for the skin and eggs of poultry. Thus, for example, the remainder of the reaction product just obtained can be admixed with 1.0 gram (0.0035 mole) of retinal according to the procedure set forth in Example 2. The reaction product thus obtained is typically red and contains an insoluble, viscous oil. Ether extraction of the red reaction product gives a crude concentrate. A typical quantity of the crude concentrate is 4.0 grams. A typical ultraviolet absorption measurement of the crude concentrate shows a maximum absorption at 386 mu. Purification of the crude concentrate by successive chromatography on 100 grams of sodium aluminum silicate and 100 grams of activated alumina (F-20 Alcoa) gives the carotenoid, a C₃₃ hydrocarbon, having the following formula:

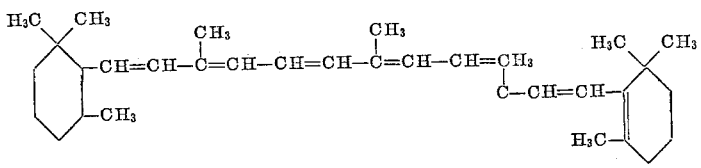

The chemical name of this compound is 1,12-bis(2,6,6-trimethylcyclohex - 1 - enyl) - 3,7,10 - trimethyldodec-1,3,5,7,9,11-hexaene. At room temperature this compound is an orange, semisolid oil. It has a typical ultraviolet light absorption value of E(1%, 1 cm) (395 mu, cyclohexane)=1400. A typical quantity of the compound obtained under these conditions is about 1.0 gram.

Example 6

This example illustrates the preparation according to a specific embodiment of this invention of a cinnamyl triphenylphosphonium salt.

A solution consisting essentially of 0.365 gram (0.01 mole) of hydrogen chloride and 2.7 milliliters of methanol if added over a period of 20 minutes to a stirred mixture at 25–30° C. consisting essentially of 1.48 grams (0.01 mole) of cinnamyl methyl ether, 2.86 grams (0.011 mole) of triphenylphosphine and 4 milliliters of methanol. The mixture thus obtained is stirred at 25–30° C. for two hours whereby a reaction product is formed. It consists essentially of cinnamyl triphenylphosphonium chloride. This compound has the following structural formula:

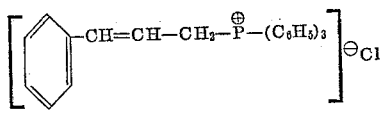

This can be verified by taking a 2 milliliter aliquot sample of the reaction product and freeing the same of solvent. The material remaining after solvent removal is a colorless glass having an ultraviolet absorption maximum of 254 mu.

This compound is useful as an intermediate in the synthesis of, for example, a carotenoid compound useful as a feed additive for poultry for pigmenting poultry skin and eggs. This carotenoid is synthesized by coupling the salt, without necessarily removing it from the reaction product with 2.5 grams (0.0088 mole) of retinal according to the procedure of Example 2. The reaction product thus obtained is red and at room temperature contains an insoluble, viscous oil. Ether extraction of the reaction product gives a crude concentrate, a typical quantity being 5.0 grams and a typical ultraviolet absorption value thereof being E(1%, 1 cm.) and (405 mu, cyclohexane)=500. After chromatography on 100 grams of sodium aluminum silicate, a filtrate residue is obtained which typically crystallizes from methanol-ether at 5° C. to give a pure C₂₉ hydrocarbon of the following formula:

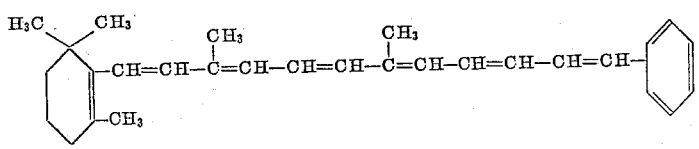

The name of this compound is 1(2,6,6-trimethylcyclohex-1 - enyl) - 12 - phenyl - 3,7 - dimethyldodec - 1,3,5,7,9,11-hexaene. This compound at 20–25° C. is typically an orange solid having an ultraviolet absorption measurement of E(1%, 1 cm.) (416 mu, cyclohexane)=2380.

Example 7

This example illustrates the preparation according to a specific embodiment of this invention of an allyl triphenylphosphonium salt.

A solution of 0.365 gram (0.01 mole) of hydrogen chloride and 2.7 milliliters of methanol is added to 0.86 gram (0.01 mole) of allyl ethyl ether, 2.86 grams (0.011 mole) of triphenylphosphine and 4 milliliters of methanol. The resulting mixture is refluxed at a temperature of about 65–70° C. for two hours. The reaction product thus obtained is freed of methanol by distillation and the residual oil triturated three times with 25 milliliter portions of diethylether to remove unreacted triphenylphosphine. The ether insoluble fraction is typically a colorless glass. It is allyl triphenylphosphine chloride which has the formula:

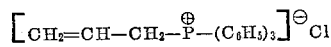

A typical quantity of this salt obtained under these conditions is 0.7 gram. This compound is useful as an intermediate in the synthesis of other compounds.

Example 8

This example illustrates the preparation according to a specific embodiment of this invention of a benzyl triphenylphosphonium salt.

A solution consisting essentially of 0.293 gram (0.0081 mole) of hydrogen chloride and 2.19 milliliters of methanol is added to 1.22 grams (0.01 mole) of benzyl methyl ether, 2.88 grams (0.008 mole) of triphenylphosphine and 4 milliliters of methanol. The resulting mixture is refluxed at a temperature of approximately 65–70° C. for two hours. After cooling of the resulting reaction mixture to 5° C. it is filtered. The filter cake thus obtained is unreacted triphenylphosphine. The filtrate is freed of methanol by distillation and the residual oil is triturated three times with 25 milliliter portions of diethylether. The ether soluble material, typically 1.5 grams of partially crystallized oil, comprises a mixture of triphenylphosphine and benzyl triphenylphosphonium chloride. This can be verified by infrared assay. The ether insoluble material is an oil at 20–25° C. It consists essentially of benzyl triphenylphosphonium chloride. The formula of this quaternary phosphonium salt is:

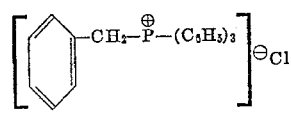

This compound is useful as an intermediate in the synthesis of other compounds.

Example 9

This example illustrates the preparation according to a specific embodiment of this invention of an ethyl lactyl triphenylphosphonium salt.

A solution consisting essentially of 0.365 gram (0.01 mole) of hydrogen chloride and 2.2 milliliters of methanol is added to 1.3 grams (0.01 mole) of the methyl ether of ethyl lactate, 2.86 grams (0.011 mole) of triphenylphosphine and 3.2 milliliters of methanol. The resulting mixture is refluxed at a temperature of about 65–70° C. for two hours. Thereafter, the reaction product thus formed is cooled to 5° C. and after standing for one hour at this temperature, it is filtered. The filter cake comprises unreacted triphenylphosphine. The filtrate is freed of methanol by distillation and the residual oil triturated three times with 25 milliliter portions of diethylether. The ether soluble material is a mixture of ethyl lactate and the desired quaternary phosphonium salt, ethyl lactyl triphenylphosphonium chloride. A typical quantity of the ether soluble material thus obtained is 0.7 gram. The ether insoluble material is predominantly ethyl lactyl triphenylphosphonium chloride which has the formula:

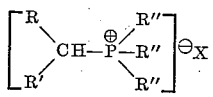

A typical quantity of the ether insoluble material is 1.1 grams. The product is useful as an intermediate in the synthesis of other compounds.

Thus, this invention provides a process for making various quaternary phosphonium salts directly from certain ethers. In particular, this invention enables retinyl triphenylphosphonium salt to be made directly from a retinyl ether.

Other features, advantages and specific embodiments of this invention will be readily apparent to those in the exercise of ordinary skill in the art after reading the foregoing disclosures. In this connection, although specific embodiments of this invention have been described in considerable detail, variations and modifications of them can be effected without departing from the spirit and scope of the invention as described and claimed.

I claim:

1. A process for making a quaternary phosphonium salt represented by the Formula I:

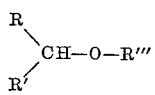

wherein R is selected from the group consisting of hydrogen and methyl radicals, R' is selected from the group consisting of (1) aliphatic, carbocyclic and carbocyclic-aliphatic radicals, each of which has olefinic unsaturation at least at the α carbon atom, and (2) carbalkoxy radicals wherein the alkoxy moieties have 1–8 carbon atoms, each R″ is independently selected from the group consisting of substituted and unsubstituted, saturated and unsaturated, aliphatic, carbocyclic and carbocyclic-aliphatic radicals, and X is an anion of a strong acid, which comprises: admixing (A) an ether represented by the formula:

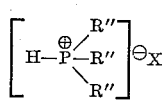

wherein R and R' have the same significance as in Formula I and R‴ is selected from the group consisting of aliphatic hydrocarbon radicals and the tetrahydropyranyl radical, and (B) a tertiary phosphine salt represented by the formula:

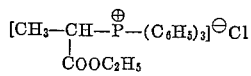

wherein R″ and X have the same significance as in Formula I, whereby a reaction product consisting essentially of a quaternary phosphonium salt represented by Formula I is formed.

2. A process for making a quaternary phosphonium salt represented by Formula I:

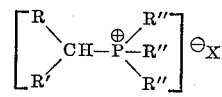

wherein R is selected from the group consisting of hydrogen and methyl radicals, R' is selected from the group consisting of (1) aliphatic, carbocyclic and carbocyclic-aliphatic radicals, each of which has olefinic unsaturation at least at the α carbon atom, and (2) carbalkoxy radicals wherein the alkoxy moieties have 1–8 carbon atoms, each R″ is independently selected from the group consisting of substituted and unsubstituted, saturated and unsaturated, aliphatic, carbocyclic and carbocyclic-aliphatic radicals, and X is an anion of a strong acid, which comprises: admixing in a liquid reaction medium consisting of an inert $C_1$–$C_8$ alkyl, monohydric alcohol at a temperature in a range from about 20 to about 150° C. for a period of time from about one-half hour to about four hours (A) an ether represented by the formula:

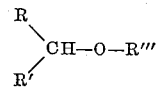

wherein R and R' have the same significance as in Formula I and R‴ is selected from the group consisting of aliphatic hydrocarbon radicals and the tetrahydropyranyl radical, and (B) at least a chemically equivalent quantity of a tertiary phosphine salt represented by the formula:

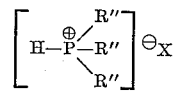

wherein R″ and X have the same significance as in Formula I, whereby a reaction product consisting essentially of a quaternary phosphonium salt represented by Formula I is formed.

3. A process for making a quaternary phosphonium salt represented by the Formula I:

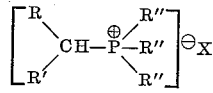

wherein R is selected from the group consisting of hydrogen and methyl radicals, R' is selected from the group consisting of (1) aliphatic, carbocyclic and carbocyclic-aliphatic radicals, each of which has olefinic unsaturation at least at the α carbon atoms, and (2) carbalkoxy radicals wherein the alkoxy moieties have 1–8 carbon atoms, each R″ is independently selected from the group consisting of substituted and unsubstituted, saturated and unsaturated, aliphatic, carbocyclic and carbocyclic-aliphatic radicals, and X is an anion of a strong acid, which comprises: dissolving in a liquid reaction medium system consisting essentially of an inert $C_1$–$C_8$ alkyl, monohydric alcohol (A) an ether represented by the formula:

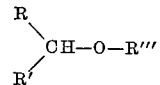

wherein R and R' have the same significance as in Formula I and R‴ is selected from the group consisting of aliphatic hydrocarbon radicals and the tetrahydropyranyl radical and (B) a quantity, at least chemically equivalent to said ether, of a tertiary phosphine represented by the formula:

wherein R″ has the same significance as in Formula I, whereby a first reaction mixture portion is formed; admixing in a liquid reaction medium consisting essentially of an inert $C_1$–$C_8$ alkyl, monohydric alcohol, a quantity of strong acid at least chemically equivalent to said tertiary phosphine, whereby a second reaction mixture portion is formed; adding said second reaction mixture portion to said first reaction mixture portion, whereby a reaction mixture is formed; and then stirring said reaction mixture at a temperature in a range from about 20 to about 150° C. for a period of time in a range from about one-half hour to about four hours.

4. A process for making a retinyl triphenylphosphonium salt, which comprises: admixing in a liquid reaction medium consisting essentially of an inert $C_1$–$C_8$ alkyl, monohydric alcohol at a temperature of 25–30° C. (A) a retinyl aliphatic hydrocarbon ether and (B) a quantity, at least chemically equivalent to said ether, of a tertiary phosphine of the formula:

wherein each R″ is independently selected from the group consisting of substituted and unsubstituted, saturated and unsaturated, aliphatic, carbocyclic and carbocyclic-aliphatic radical, whereby a first reaction mixture portion is formed; admixing a liquid reaction medium consisting essentially of an inert $C_1$–$C_8$ alkyl, monohydric alcohol in a quantity of a strong acid at least chemically equivalent said tertiary phosphine, whereby a second reaction mixture portion is formed; admixing said second reaction mixture portion with said first reaction mixture portion, whereby a reaction mixture is formed; and stirring said reaction mixture at 25–30° C. for a period of time in a range from about one-half hour to about four hours.

5. A process according to said claim 4, wherein said ether is retinyl methyl ether.

6. A process according to claim 4, wherein said ether is retinyl methyl ether, said tertiary phosphine is triphenylphosphine, and said alcohol is methanol.

7. A process according to claim 4, wherein said ether is methyl β-retinyloxy propionate.

8. A process according to claim 4, wherein said ether is retinyl β-retinyloxy propionate, said tertiary phosphine is triphenylphosphine and said alcohol in each case is methanol.

9. A process for making a β-ionylideneethyl triphenylphosphonium salt, which comprises: admixing in a liquid reaction medium consisting essentially of an inert $C_1$–$C_8$ alkyl, monohydric alcohol at a temperature of 25–30° C. (A) an aliphatic hydrocarbon ether of β-ionylidene ethanol and (B) a quantity, at least chemically equivalent to said ether, of a tertiary phosphine of the formula:

wherein each R″ is independently selected from the group consisting of substituted and unsubstituted, saturated and unsaturated, aliphatic, carbocyclic and carbocyclic-aliphatic radicals, whereby a first reaction mixture portion is formed; admixing a liquid reaction medium consisting essentially of an inert, $C_1$–$C_8$ alkyl, monohydric alcohol in a quantity of a strong acid at least chemically equivalent to said tertiary phosphine, whereby a second reaction mixture portion is formed; admixing said second reaction mixture portion with said first reaction mixture portion, whereby a reaction mixture is formed; and stirring said reaction mixture at 25–30° C. for a period of time in a range from about one-half hour to about four hours.

10. A process according to claim 9 wherein said ether is the methyl ether of β-ionylidene ethanol.

11. A process for making a β-ionyl triphenylphosphonium salt, which comprises: admixing in a liquid reaction medium consisting essentially of an inert $C_1$–$C_8$ alkyl, monohydric alcohol at a temperature of 25–30° C. (A) an aliphatic hydrocarbon ether of β-ionol and (B) a quantity, at least chemically equivalent to said ether, of a tertiary phosphine of the formula:

wherein each R″ is independently selected from the group consisting of substituted and unsubstituted, saturated and unsaturated, aliphatic, carbocyclic and carbocyclic-aliphatic radicals, whereby a first reaction mixture portion is formed; admixing a liquid reaction medium consisting essentially of an inert, $C_1$–$C_8$ alkyl, monohydric alcohol in a quantity of a strong acid at least chemically equivalent to said tertiary phosphine, whereby a second reaction mixture portion is formed; admixing said second reaction mixture portion with said first reaction mixture portion, whereby a reaction mixture is formed; and stirring said reaction mixture at 25–30° C. for a period of time in a range from about one-half hour to about four hours.

12. A process according to claim 1 wherein said ether is β-ionyl tetrahydropyranyl ether.

13. A process for making a cinnamyl triphenylphosphonium salt, which comprises: admixing in a liquid reaction medium consisting essentially of an inert $C_1$–$C_8$ alkyl, monohydric alcohol at a temperature of 25–30° C. (A) an aliphatic hydrocarbon ether of cinnamol and (B) a quantity, at least chemically equivalent to said ether, of a tertiary phosphine of the formula:

wherein each R″ is independently selected from the group consisting of substituted and unsubstituted, saturated and unsaturated, aliphatic, carbocyclic and carbocyclic-aliphatic radicals, whereby a first reaction mixture portion is formed; admixing a liquid reaction medium consisting essentially of an inert $C_1$–$C_8$ alkyl, monohydric alcohol in a quantity of a strong acid at least chemically equivalent to said tertiary phosphine, whereby a second reaction mixture portion is formed; admixing said second reaction mixture portion with said first reaction mixture portion, whereby a reaction mixture is formed; and stirring said reaction mixture at 25–30° C. for a period of time in a range from about one-half hour to about four hours.

14. A process according to claim 13, wherein said ether is cinnamyl methyl ether.

References Cited

UNITED STATES PATENTS 2,950,321   8/1960   Sarnecki et al. _____ 260—606.5
3,294,844   12/1966  Sarnecki et al. _____ 260—606.5

TOBIAS E. LEVOW, *Primary Examiner.*

HELEN M. McCARTHY, *Examiner.*

W. F. W. BELLAMY, *Assistant Examiner.*